United States Patent
Story, Jr. et al.

(10) Patent No.: US 9,870,128 B1
(45) Date of Patent: Jan. 16, 2018

(54) RULE-BASED PRESENTATION OF RELATED CONTENT ITEMS

(71) Applicant: Audible, Inc., Newark, NJ (US)

(72) Inventors: Guy Ashley Story, Jr., New York, NY (US); Ajay Arora, New York, NY (US); Douglas Scott Goldstein, Riverdale, NJ (US); Douglas Cho Hwang, New York, NY (US)

(73) Assignee: Audible, Inc., Newark, NJ (US)

( * ) Notice: Subject to any disclaimer, the term of this patent is extended or adjusted under 35 U.S.C. 154(b) by 612 days.

(21) Appl. No.: 13/770,983

(22) Filed: Feb. 19, 2013

(51) Int. Cl.
*G06F 3/0484* (2013.01)

(52) U.S. Cl.
CPC .................................. *G06F 3/0484* (2013.01)

(58) Field of Classification Search
CPC ........ G06F 3/0481; G06F 9/4443; G06F 3/14; G06F 1/1616; G09G 5/14
See application file for complete search history.

(56) References Cited

U.S. PATENT DOCUMENTS

| | | | | |
|---|---|---|---|---|
| 8,699,862 | B1* | 4/2014 | Sharifi | G11B 27/10 386/338 |
| 2001/0039571 | A1* | 11/2001 | Atkinson | 709/217 |
| 2004/0090390 | A1* | 5/2004 | Mason | G06F 1/3218 345/1.1 |
| 2004/0117825 | A1* | 6/2004 | Watkins | 725/40 |
| 2007/0208766 | A1 | 9/2007 | Malik | |
| 2008/0082922 | A1* | 4/2008 | Biniak | H04N 7/17318 715/719 |
| 2009/0024922 | A1 | 1/2009 | Markowitz | |
| 2009/0199117 | A1 | 8/2009 | Yamamoto | |
| 2010/0077433 | A1 | 3/2010 | Beyabani | |
| 2010/0205628 | A1* | 8/2010 | Davis | H04M 1/72533 725/25 |
| 2011/0153047 | A1* | 6/2011 | Cameron et al. | 700/94 |
| 2011/0261259 | A1* | 10/2011 | Phillips | H04N 5/44591 348/565 |
| 2012/0221936 | A1* | 8/2012 | Patterson et al. | 715/230 |

(Continued)

FOREIGN PATENT DOCUMENTS

CN 202502737 U * 10/2012

OTHER PUBLICATIONS

Cees et al., "Multimodal Video Indexing: A Review of the State-of-the-art," Multimedia Tools and Application, Jan. 2005, vol. 25, Issue 1, pp. 5-35.

*Primary Examiner* — Jeffrey A Gaffin
*Assistant Examiner* — Mandrita Brahmachari
(74) *Attorney, Agent, or Firm* — Knobbe, Martens, Olson & Bear, LLP

(57) ABSTRACT

Features are disclosed for presenting multiple content items based on one or more rules defining how the multiple content items are to be presented. One content item may be a primary content item, and any number of additional content items may be related to or supplement the primary content item in some way. Rules may define which related content items may be presented and, in the case of multimedia content (e.g., content with both audio and video elements), which elements of the primary content may be overridden by or mixed with related content, and which may not. References to related content may be embedded in the primary content item, or references may be accessed at a content management system or service.

28 Claims, 9 Drawing Sheets

(56) References Cited

U.S. PATENT DOCUMENTS

| | | | |
|---|---|---|---|
| 2012/0272185 A1 | 10/2012 | Dodson et al. | |
| 2012/0303742 A1* | 11/2012 | Hines | H04N 21/6543 709/217 |
| 2013/0346906 A1* | 12/2013 | Farago | G06F 3/04883 715/776 |
| 2014/0304731 A1* | 10/2014 | Dhawan | G06Q 30/00 725/32 |

* cited by examiner

RULE-BASED PRESENTATION OF RELATED CONTENT ITEMS

BACKGROUND

Electronic devices may be used to consume content, such as audio books, television shows, movies, and music. In a common application, a user may view video content or listen to audio content on a home entertainment system. Home entertainment systems can include any number of purpose-built media devices, such as televisions, stereos, video game systems, and desktop computers that provide rich content consumption experiences. Users may also use personal computing devices to consume content. For example, a user may use a smart phone, tablet computer, portable media player or laptop computer to consume content. Such devices may include both audio and video output components, or they may include only an audio output component.

Television shows, movies, audio books and the like can include topics and items that may be associated with supplementary or otherwise related content. The items of related content often contain useful or interesting information, such as additional background or explanatory text regarding an event, location or person referenced in the primary content, commentary regarding the primary content in general or a closely related topic, and the like. For example, a television show may reference a historical event, or it may cover only part of a subject. Viewers may be invited to consume additional content related to, e.g., the historical event or other areas of the subject. In some cases, viewers may be provided with a network address of a content server at which they can access the content, or viewers may be shown a commercial or other promotion for another television show with related content.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1A:
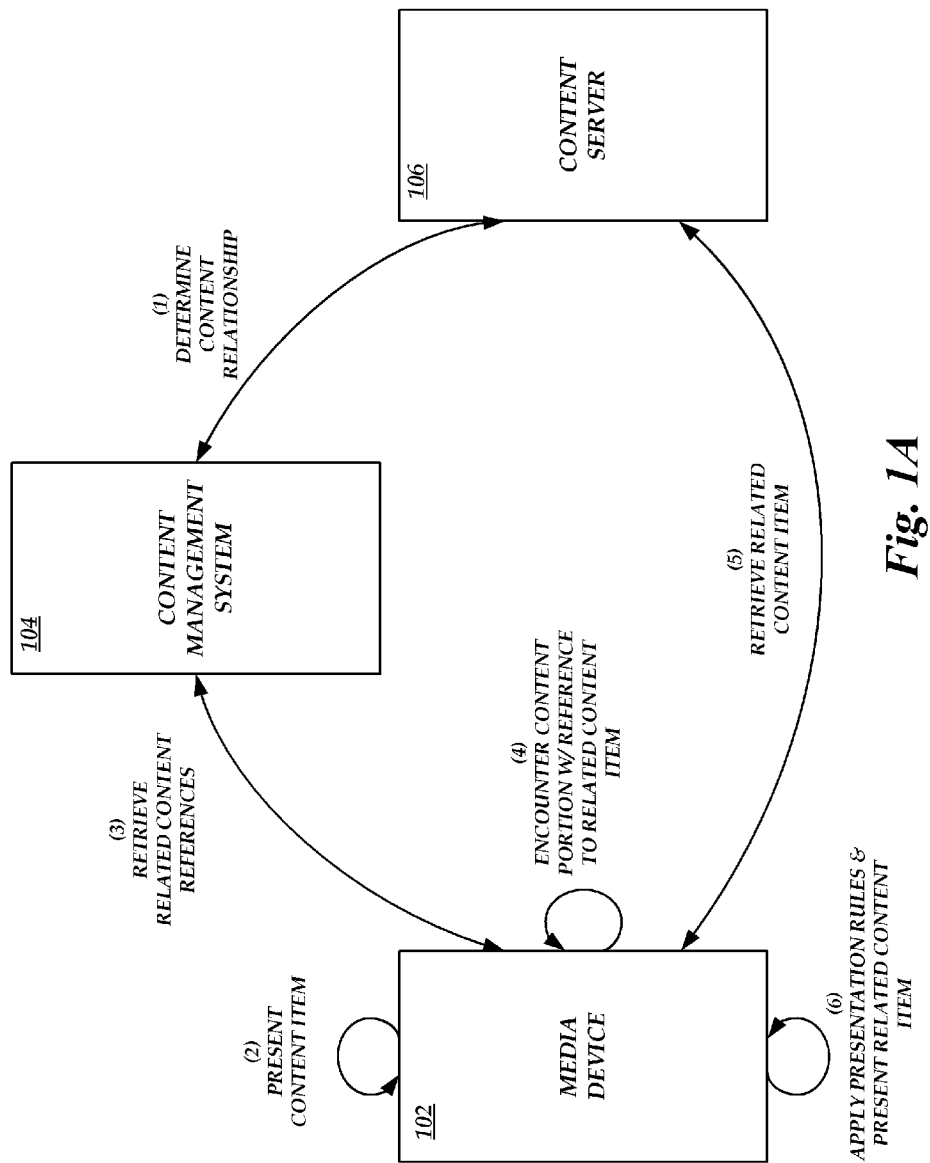
FIG. 1A is a block diagram of illustrative interactions between a media device, a content management system and a content server, as might occur during presentation of a content item with related content items.

Generally described, the present disclosure relates to managing presentation of multiple related content items, in some cases simultaneously or substantially simultaneously. Conventionally, a user may use a media device such as a television or computing device to present a content item. The content may include, but is not limited to, audio books, music, television shows, movies, games or some other electronic content. The content may be associated with supplemental or other related content, such as background content regarding a character or event. In order for the user to access such related content, the user may have to perform a manual process of stopping or pausing presentation of the primary content item in order to access the supplemental content. In some cases, users can access supplemental or related content simultaneously with consumption of the primary content item, such as by using a different device (e.g., a computing device) to access the related content while the primary content is presented on the television.

Aspects of this disclosure relate to identifying and automatically presenting supplemental or related content during presentation of a primary content item. Presentation rules, also referred to herein simply as rules, may be defined which specify which types of related content may be presented, under what circumstances the related content is to be automatically presented or suppressed, which media elements or other portions of a primary content item (e.g., audio or video tracks of a movie) are to be overridden by or mixed with related content, and the like. In some embodiments, a primary content item may contain embedded references to supplemental content that is related to the primary content item as a whole or to a specific portion of the primary content item, such as a person, place, thing, event or period of time. When such an embedded reference is encountered during presentation of the primary content item, the referenced supplemental content item can be accessed and automatically presented according to one or more rules. In some cases, the rules may indicate that the related content item (or some portion thereof) is to override the primary content item (or some portion thereof). For example, when the primary content item is a televised sporting event and the related content item is a local radio broadcast of the sporting event, a rule may specify that the media device is to automatically present the audio element or other audio portion of the local radio broadcast instead of the audio element or other audio portion of the primary content.

The example rules described herein are illustrative only, and not intended to be limiting. In some embodiments, rules may be defined with respect to various aspects or elements of content items (e.g., some rules apply to audio elements or other audio portions and some rules apply to video elements or other video portions), genres of content (e.g., some rules apply to televised sporting events while other rules apply to audio books), and the like. Generally described, a rule can specify which content type and/or media element may override another content type and/or media element, and under what circumstances such overrides may be implemented. Rules may also specify which content type and/or media elements may be overridden, and under what circumstances. In addition, rules may specify that certain content is not to be overridden, but rather is to be paused or should continue to be presented simultaneously with other content using audio mixing or split screen video display techniques. Further, rules may specify when overrides may be applied automatically, and when users may be notified of the presence of a related content item and may therefore make an affirmative decision regarding the presentation of each content item.

Additional aspects of the disclosure relate to obtaining references to related content from a network-accessible content management system. Rather than references to related content being embedded in a primary content item, the references may be maintained by and obtained from a content management system. The references may be obtained before or during playback of the primary content item. For example, when a user initiates presentation of a content item (e.g., a conventional DVD without embedded references to related content) on a media device, the media device may contact the content management system to obtain references to related content and data regarding portions of the primary content item to which the related content applies. As another example, a user may initiate presentation of a live content item (e.g., a live broadcast of a sporting event) in which some or all related content references may be unknown at the time presentation is initiated. In such cases, the media device can obtain related content references from the content management system in substantially real-time, or periodically during presentation of the primary content.

Further aspects of the disclosure relate to user interaction with the content items and user configuration of presentation rules. For example, the user may access an interface to define presentation rules, set defaults, and the like. In addition, rather than automatically overriding portions of the primary content item with related content, a user may be prompted as to whether the primary content is to be overridden or paused, or whether the related content is to be ignored. For example, when a place is mentioned during a news cast, the place may be associated with a related documentary. A notification may be displayed to the user that the documentary is available. The user may choose to override the video element of the news cast with the video element of the documentary while the audio element of the news cast continues to be presented. Alternatively, the user may choose to pause the news cast in order to view the documentary, or the user may wish to view the documentary and designate the documentary as the primary content item. If a user designates a related content item as a primary content item, then content that is related to the new primary content item—the documentary in this case—can be obtained rather than content that is related to the previous primary content item—the news cast in this case. The previous primary content item may then be a related content item for the new primary content item. Rules may be applied to the new primary content item and the newly-designated related content item, and those rules may result in a different playback configuration than rules applied to the content items under their previous designations.

Although aspects of the embodiments described in the disclosure will focus, for the purpose of illustration, on a media device obtaining related content from network-accessible servers, one skilled in the art will appreciate that the techniques disclosed herein may be applied to any number of processes or applications. For example, related content may reside on the media device itself, or it may be obtained from sources other than network-accessible servers, such as via satellite or cable television systems and the like. Various aspects of the disclosure will now be described with regard to certain examples and embodiments, which are intended to illustrate but not limit the disclosure.

With reference to an illustrative example, a user may wish to consume a content item and also access separate but related content items simultaneously. The user may initiate presentation of a primary content item, such as an audio book, on a media device, such as a smart phone or portable media player. The audio book may be associated with supplemental or related content that may be presented during presentation of the audio book. For example, when the user is listening to an audio book about a songwriter's life, the audio book may contain embedded references to related content, such as network addresses at which the media device can stream excerpts of songs written by the songwriter. In such cases, the excerpts of the songs can be mixed with the audio book (e.g., played simultaneously) at a relevant playback time or location within the audio book, such as during portions describing the conception or recording of the songs.

Rules for how content of one type may override other content types may be defined, either by default or by the user. In the present example, rules may specify that recordings of songs written by the songwriter may be mixed with the audio book, while other related audio (e.g., interviews with the songwriter) may be presented while the audio book is paused. As another example, a video clip may relate to the audio book. If the media device includes video presentation capabilities, a rule may specify that the video clip may be presented with its audio muted such that the audio book may continue to be presented during playback of the video clip.

Content may include both video and audio elements. The audio and video elements, collectively referred to herein as media elements or simply elements, may include elements such as audio tracks, video tracks, or other sensory elements of a movie, audio book, song, video game, or some other electronic content. As one example, a content item may be a sports broadcast that includes both audio elements (e.g., spoken commentary regarding the sporting event) and video elements (e.g., video clips or feeds of the sporting event).

While the sports broadcast is presented, or when presentation is initiated, references to related content, such as a local radio broadcast of the sporting event, may be obtained from a separate content management system or service. Rules can be implemented which allow for or require replacement of the sports broadcast's audio element with the local radio broadcast in the case of a live sports broadcast; otherwise, the rules may allow the media device to offer to pause the video programming to listen to the related audio.

In some cases, the initial content that the user wishes to consume, also referred to as the primary content, may include a video element or other video portion and the related content may also include a video element or other video portion. For example, when the user is watching a television program and there is a documentary related to a portion of the television program, rules may be applied in which the media device replaces the video element of what is currently being watched with the video element of the related content, but retain the audio element of the primary content whenever the primary content is news or "informational" programming. When the primary content is not news, rules may be applied in which video elements of both content items are presented simultaneously in a picture-inpicture ("PIP") or split-screen format. If multiple displays are available, the two video elements may be presented substantially simultaneously on different displays. For example, the media device may control two or more video monitors, or the media device can display one video element on a video monitor and transmit the second video element, or information about the second video element, to a different device such as a tablet computer.

In some embodiments, a user may configure rules for individual content types or genres. For example, the user may configure rules directed to talk shows, news shows, live baseball games, and a specific television series such that any related video content may automatically override the video of the primary content (e.g., the video element of the related content is presented without any prompt to the user), but the related audio content is not presented (e.g., the audio element from the primary content item remains the only audio element that is presented). The user may configure separate rules for audio books, such that when the related content is music, the music is to be mixed or otherwise simultaneously presented with the audio book content, while related audio content that is not musical is suppressed and the audio book continues to be the only content item that is presented audibly. Alternatively, the user may configure rules such that the audio book is paused and the related audio content is automatically played or the user is prompted as to whether the related audio content is to be played.

In some embodiments, a supplemental or related content item may be associated with multiple portions of a primary content item. For example, a music clip may be associated with a position within a chapter of an audio book, and also associated with the end of the same chapter. In this case, a user may have multiple opportunities to hear the related item. In embodiments where associations of related content would cause the related item to be presented or made available multiple times during playback of the primary content, rules may be applied such that presentation of the related content or an indication of the availability of that related content may be suppressed after the first presentation of the related content or after the first indication that the related content is available. Under other rules, presentation or indication of related content may be allowed even after the related content has been fully played.

Related content may be accessed from a network-accessible content server. Alternatively, or in addition, related content may be stored on a media device or local storage component associated with a media device. Related content may be retrieved at substantially the same time as presentation of a primary content item is initiated. Alternatively, a media device may be configured to retrieve related content periodically. For example, a network enabled television may query a remote content server associated with related content every n seconds or minutes during presentation of the primary content item in order to determine whether new related content is available, particularly in the case of live or substantially live broadcasts. In still other embodiments, a content server or a content management system may be configured to notify a media device of available supplemental information.

In some embodiments, key portions of the primary content item may be designated such that the user is presented with those key portions regardless of any available related content. For example, crucial plot developments in a movie or audio book may be presented to the user regardless of any available related content item or rule that may be applicable at the time. Otherwise, the user may lose track of the development of the primary content item and the user's continued enjoyment of the primary content item may be jeopardized.

In some embodiments, a user may designate a related content item as a primary content item, thereby replacing the previous primary content item. For example, if the user is watching a broadcast of a sporting event and the score is such that the game is uninteresting, the user may wish to make a currently presented related content item (e.g., a documentary, currently being displayed in the secondary presentation window of a PIP display, regarding one of the teams) as the primary content item. In such cases, content that is related to the new primary content item—the documentary in this case—will be obtained, rather than content that related to the previous primary content item—the sporting event in this case.

Networked Content Consumption Environment

Figure 1B:
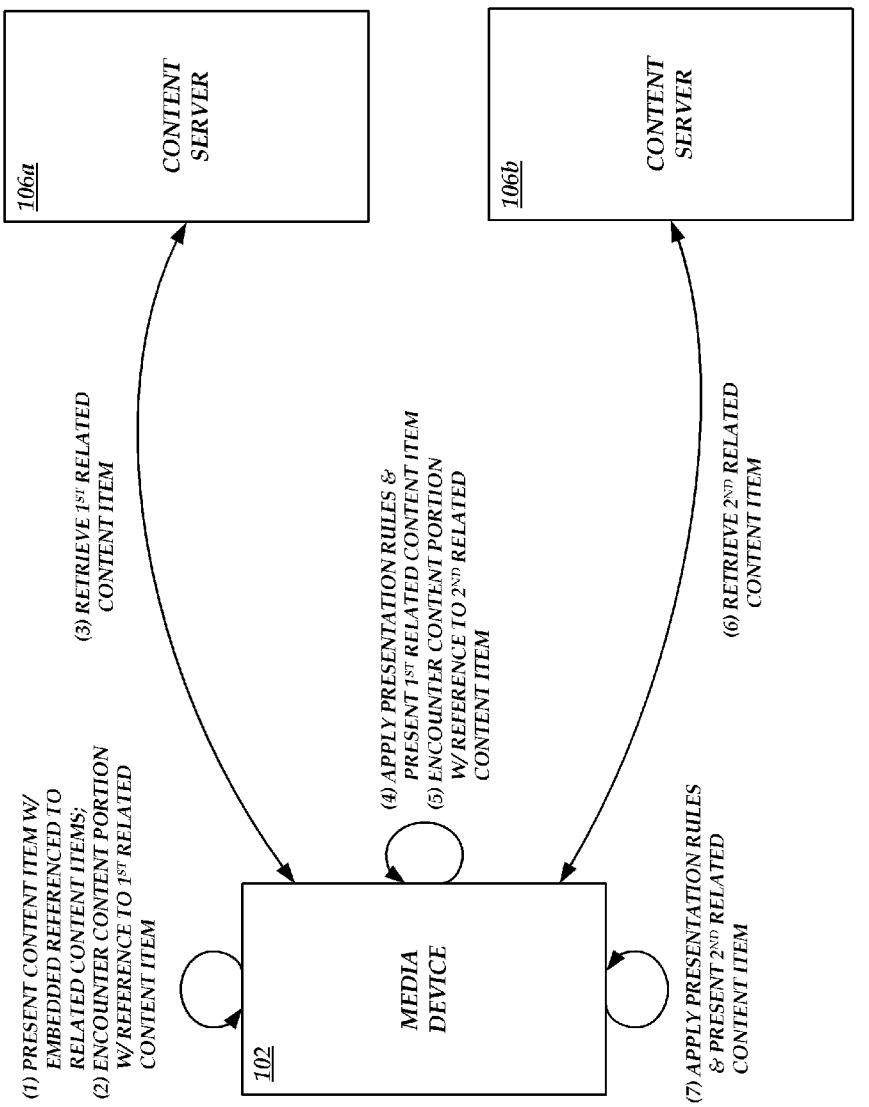
FIG. 1B is a block diagram of illustrative interactions between a media device and multiple content servers, as might occur during presentation of a content item with related content items.

Prior to describing embodiments of the related content presentation and rule application process in detail, example networked content consumption environments in which the process may be implemented will be described. FIGS. 1A and 1B show example networked content consumption environments and illustrative data flows and interactions between various entities of the networked content consumption environments.

FIG. 1A illustrates a networked content consumption environment with a media device 102, a content management system 104, and a content server 106. The content management system 104 may store data regarding which content items are related to a primary content item that may be presented on the media device 104. For example, the content management system 104 can obtain content relationship information from a content server 106 at (1) regarding content offered by the content server 106. Other techniques for determining and maintaining content relationship and reference information are described below.

At (2), a user may use a media device 102 to present a content item, such as an audio book. In this case, the audio book is considered the primary content item, because it is the content item for which the user initiated presentation. The media device 102 may be associated with a content management system 104 for obtaining references to related content items, or the primary content item itself may be associated with the content management system 104. In either case, the media device 102 can retrieve related content references from the content management system 104 at (3). The related content references may be obtained in bulk (e.g., all content references obtained in one transmission at or substantially close to initiation of primary content presentation), or they may be obtained during presentation of the primary content item.

At (4), the media device 102 may, during playback of the audio book, encounter a portion of the audio book that is associated with a reference to related content. In this example, the related content item may be a music clip hosted by the content server 106. The media device can therefore retrieve or stream the related content item from the content server 106 at (5). In some embodiments, the related content item may be hosted by the content management system 104 or a different content server, or it may be stored on the media device 102.

At (6), the media device 102 can apply presentation rules to the primary content item and the related content item (e.g., the audio book and the music clip) to determine how the related content item should be presented. The media device 102 may then present the related content item according to the rules. In the present example, the user may have configured a rule that music clips related to audio books may be mixed or overlaid with the audio of the audio book at the proper point within the audio book. However, if the related content was a different type of content (e.g., a related audio book), different rules may apply. For example, the applicable rules may specify that the user is to be prompted regarding presentation of the related content rather than automatically presenting both items simultaneously.

In some embodiments, related content may be hosted by and/or retrieved from multiple content servers, rather than from a single content server 106. The content management system 104 can determine content relationships between various content items hosted by multiple content servers, and the media device can retrieve related content from the appropriate content server 106.

Turning now to FIG. 1B, another embodiment of a networked content consumption environment is illustrated. In the networked content consumption environment of FIG. 1B, no separate content management system 104 is used. Rather, the media device may obtain references to related content directly from the primary content. For example, the primary content item may include embedded references to related content, or the primary content may be associated with separate data regarding related content. In either case, the media device 102 can use the references to obtain the related content from content servers 106a and 106b, among other content sources.

At (1), the media device 102 can present a primary content item with embedded references to related content items. Returning to the example above, the media device may present an audio book. In some embodiments, the primary content may be associated with related content information that is not embedded into primary content item. The primary content item may be accessed from a storage device associated with the media device 102, from removable media, from a network-accessible content server, etc.

At (2), the media device 102 may encounter a portion of the primary content item that is associated with a related content item (e.g., a reference to a related content item, such as a music clip, is associated with the portion of the audio book). At (3), the media device 102 may retrieve the related content item from a content server 106a. The media device 102 may apply presentation rules and present the related content item, as described above and in detail below (e.g., the media device 102 may mix or overlay the audio of the audio book and the music clip for simultaneous presentation).

Subsequently, the media device may encounter a reference to a second related content item at (5). For example, the media device may encounter a reference to video footage of the subject of the audio book. The reference may indicate that the second related content item is hosted by a different content server 106b. In some embodiments, multiple content items may be hosted by and/or retrieved from a single content server as described above with respect to FIG. 1A, such as the content server 106a that hosted the first related content item.

At (6), the media device 102 can retrieve the second related content item from the content server 106b. The media device 102 can apply presentation rules regarding the second related content item at (7), and present some portion of or the entire second related content item as appropriate. For example, a rule may be applied such that because the primary content item is an audio book, video content may be presented with the audio element of the video content suppressed so that the audio may continue to be presented.

Figure 2:
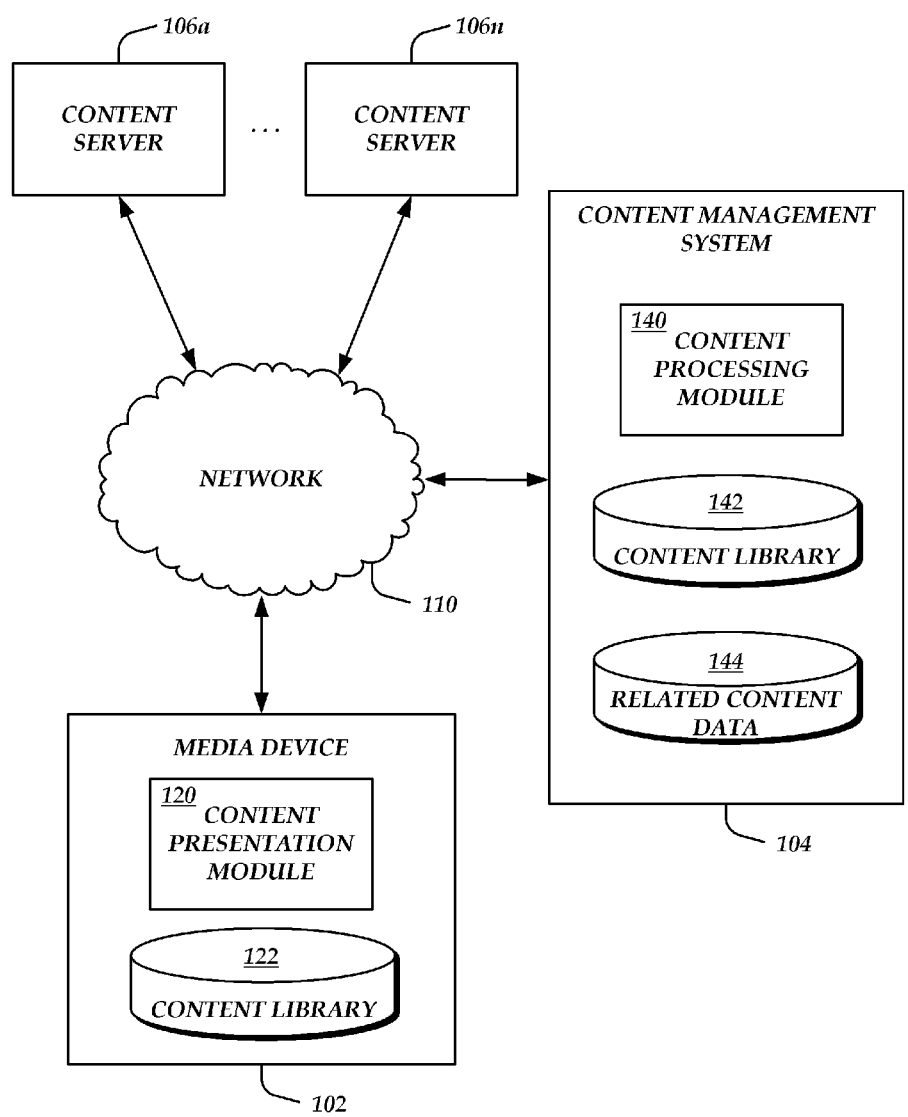
FIG. 2 is a block diagram of an illustrative media device, content management system, and content servers showing various modules and data stores of the media device and the content management system.

FIG. 2 illustrates a networked content consumption environment including a communication network 110, a media device 102, a content management system 104, and any number of content servers 106a-106n. The communication network 110 may be any wired network, wireless network, or combination thereof. In addition, the network 110 may be a personal area network, local area network, wide area network, cable network, satellite network, cellular telephone network, or combination thereof. For example, the communication network 110 may be a publicly accessible network of linked networks, possibly operated by various distinct parties, such as the Internet. In some embodiments, the communication network 110 may be a private or semi private network, such as a corporate or university intranet. The communication network 110 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The media device 102 can correspond to a wide variety of electronic devices. In some embodiments, the media device 102 can include audio or visual output components, such as speakers or video screens. For example, the media device 102 may be a television, stereo, digital video recorder (DVRs), digital media receiver, set-top box, desktop computer, server computer or the like. In some embodiments, a media device 102 may also be a personal device, such as a smart phone, mobile media player, laptop computer or tablet computer that is optionally configured with a video display and/or an audio output component, or that may be connected to external displays, speakers, stereos, or the like. Some media devices 102 may include one or more processors and a storage or memory which may contain software applications executed by the processors. The software of the media device 102 may include modules or applications for establishing communications over the network 110. In addition, the software applications may include multimedia applications which play or otherwise execute audio programs such as music or audio books, video programs such as movies or television shows, and video games. The storage of the media devices 102 may also contain copies of content to play on the speakers or video screens.

As further shown in FIG. 2, the media device 102 can include a content presentation module 120. The content presentation module 120 can manage presentation of a primary content item to a user, obtaining references to related content (e.g., embedded into the primary content item or received from the content management system 104), and applying rules for presenting multiple content items as described in detail below. In some embodiments, the media device 102 may also include a local content library 122 in which the media device 102 stores primary or related content items. In some cases, the primary content may be streamed from a separate network-accessible system or accessed from removable media (e.g., DVDs).

The content management system 104 illustrated in FIG. 2 may correspond to a logical association of one or more computing devices configured to maintain information regarding related content items and distribute the information to media devices 102. The information may reference content items hosted by content servers 106, the content management system 104 itself, or content that may be stored on a media device 102. For example, the content management system 104 may communicate with the media device 102 via the communication network 110. The media device 102 may request data regarding content items related to a currently presented or soon-to-be presented content item. The content management system 104 can transmit the requested data to the media device 102. In some cases, the content management system 104 can transmit the related content to the media device 102. The content management system 104 can obtain data regarding the related content items from content servers 106, from developers of content items, or from an automated analysis of content, such as crowd-source data, social network data, search results, and the like.

The content management system 104 can include a content processing module 140, a content library 142, and a related content data store 144. The content processing module 140 can process potential primary content items and determine whether supplemental or related content is available for portions of the primary content or for the primary content as a whole. For example, the content processing module can access content searches, data from content developers and providers, transcripts of content presentations, etc. The content management system 104 can store data regarding the relationships (e.g., an identifier of the primary content, an identifier of the related content, a network address of the related content, and data regarding the portion of the primary content to which the related content applies) in the related content data store 144. In some cases, the content management system 104 may store primary and/or related content in a content library 142. For example, a content developer may establish a content management system 104 that hosts primary content items in the content library 142 and includes predetermined references to related content in the related content data store 144.

The content servers 106a-106n can correspond to logical associations of one or more computing devices for hosting content and servicing requests for the hosted content over the network 110. For example, a content server 106a can include a web server component corresponding to one or more server computing devices for obtaining and processing requests for content (such as streaming video or audio) from the media device 102, the content management system 104, or other devices or service providers. In some embodiments, one or more content servers 106 may be associated with a CDN service provider, an application service provider, etc.

In some embodiments, the networked content consumption environment may include additional or fewer components that those illustrated in FIG. 2. For example, as illustrated in FIG. 1A, a media device 102 may connect directly to content servers 102 and not utilize the services of a content management system 104.

Process for Rule-Based Presentation of Multiple Content Items

Figure 3:
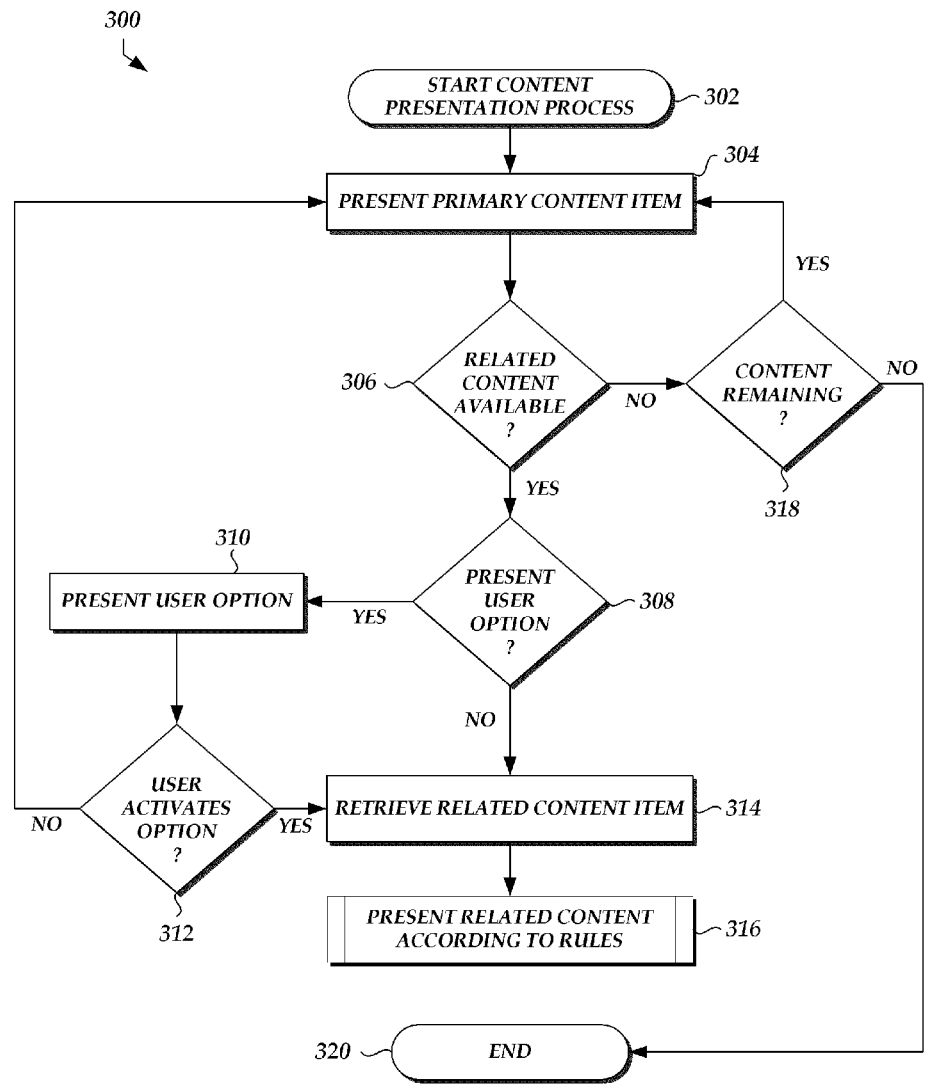
FIG. 3 is a flow diagram of an illustrative process for presenting a content item and related content items according to rules for presentation of related content.

FIG. 3 illustrates a process 300 that may be used to for rule-based presentation of multiple content items. Advantageously, the process 300 may be automatically performed by a media device 102 during presentation of a primary content item such that related content items may be presented to enhance the user's content consumption experience. Elements of related content may override elements of the primary content according to certain rules, while elements of the primary content may override elements of the related content according to the same rules or other rules. In addition, users may be interactively prompted to determine whether to present related content and which portions thereof to present or override.

The process 300 begins at block 302. For example, if the process 300 is implemented by a media device 102, the process 300 may begin automatically upon power up or it may be manually initiated by a user wishing to consume content. The process 300 may be embodied in a set of executable program instructions stored on a computer-readable medium, such as one or more disk drives, of a computing system with which the media device 102 is associated. When the process 300 is initiated, the executable program instructions can be loaded into memory, such as RAM, and executed by one or more processors of the computing system. In some embodiments, the computing system may include multiple computing devices, such as servers, and the processes may be executed by multiple servers, serially or in parallel.

At block 304, the primary content item may be presented. As described above, the primary content may be any type of electronic content. The primary content may be streamed from a network-accessible server, loaded from a local storage device or removable media, etc. The primary content item may be associated with various related content items, and data regarding the related content items may be obtained as described above.

Figure 4A:
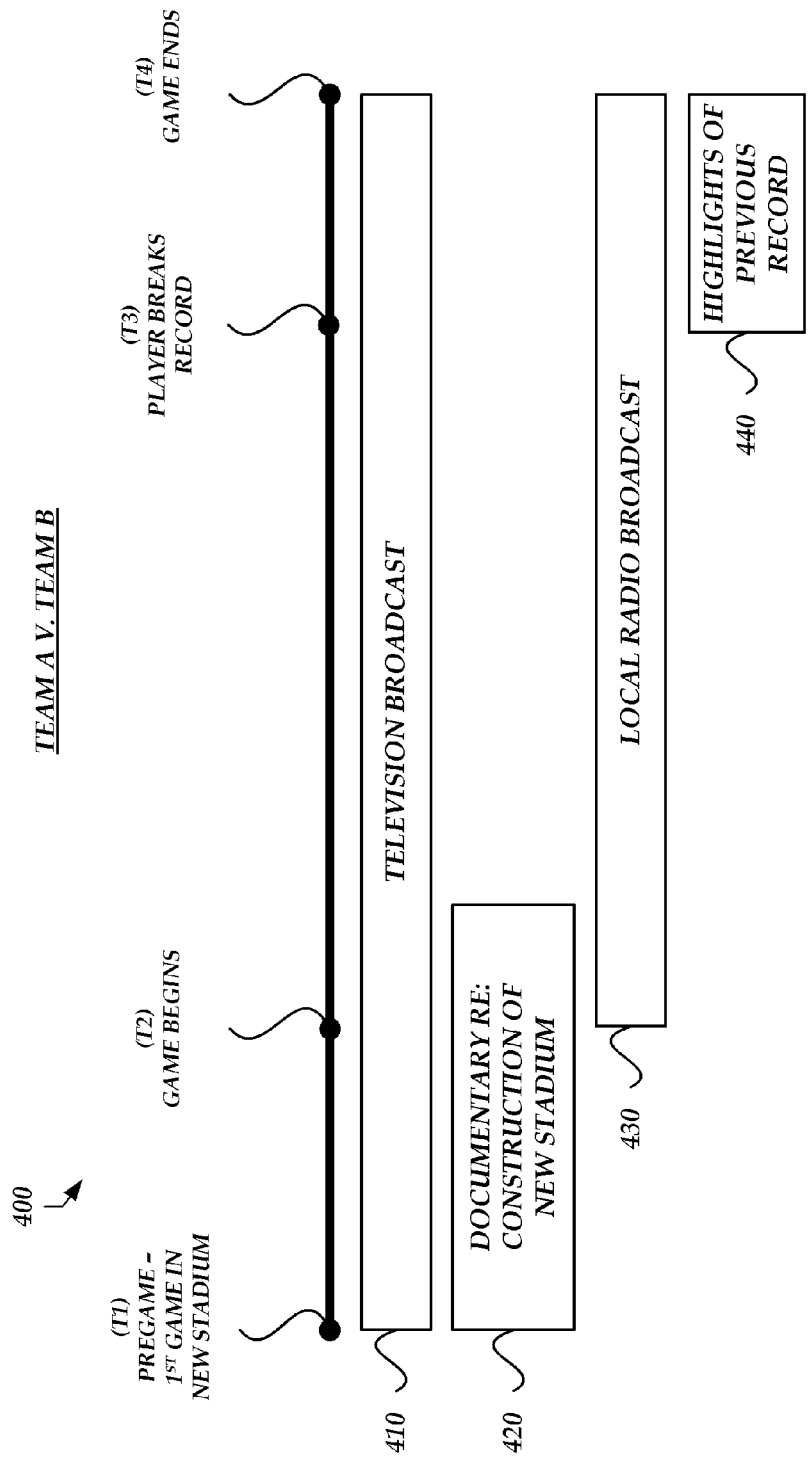
FIG. 4A is a timeline of presentation of a primary content item and several related content items which may be presented in full or in part at various points during presentation of the primary content item.

FIG. 4A shows a timeline of an illustrative content item, in this case a television broadcast 410 of a sporting event between Team A and Team B. At various points in time (T1, T2 and T3) the television broadcast 410 is associated with related content 420, 430 and/or 440. The related content items may relate to the primary content item 410 as a whole, or to a particular element of the primary content item 410, such as a person, place, thing, event, etc. Related content 420 is a documentary regarding construction of the stadium in which the sporting event between Team A and Team B is taking place, while related content 430 is a local radio broadcast of the sporting event in general. Related content 440 includes video highlights of a record that is broken during the sporting event. Because it is difficult to predict when a record may be broken (or when other events occur in a live broadcast), such related content items may be associated with the primary content item 410 in real-time or substantially real-time, as described in detail below.

With continuing reference to FIG. 3, at decision block 306 the media device 102 may determine whether there is related content available associated with the primary content 410 at the current presentation time or content related to a soon-to-be presented portion of the primary content item 410. In the present example, the media device 102 may determine at times T1, T2, and T3 that a related content item is available and proceed to decision block 308. If there is no related content available at the present time (e.g., a time between T2 and T3 in the example illustrated in FIG. 4A), the process may proceed to decision block 318 where the media device 102 determines whether there is primary content 410 remaining to be presented.

At decision block 308, the media device 102 may determine whether to present to the user an option, prompt or some other notification regarding the related content item. The media device 102 may store or access rules regarding which related content items and types to automatically present to the user. For example, if the related content item is a video and the primary content is a video, rules or policies may apply such that the user should be prompted rather than automatically pausing or overriding the video element of the primary content item 410. However, if the media device 102 is capable of presenting multiple video elements simultaneously (e.g., PIP or split-screen), then no user prompt may be needed.

In some embodiments, the media device 102 may not have information about the specific characteristics of the content item, such as whether it is has both video and audio elements or only an audio element. Rather, the information available to the media device 102 (e.g., embedded into the primary content item or received separate from the primary content item) may only indicate the location from which to obtain the related content item and/or an identifier of the related content item. In such cases, the media device 102 may prompt the user for a command regarding the related content item or passively notify the user that related content is available should the user wish to consume it. The related content item may be obtained from its source in order to determine its nature (e.g., whether it is video or audio content) in order to provide the user with additional information, or the nature of the related content item may be determinable from the reference itself (e.g., a file extension included in the reference).

In the present example, at time T1 the media device 102 may determine that no user notification should be presented regarding related content item 420. Such a determination may be based, for example, on a rule regarding the presentation of related content during a preliminary portion of a sporting event broadcast. Under different circumstances (e.g., after the sporting event has begun), different rules may apply and may specify that the user is to be notified of the related content item 420 rather than automatically presented with the related content item 420. In such cases the process 300 may proceed to block 314, where the related content item is retrieved, and subsequently to block 316, where presentation rules are applied.

Figure 5A:
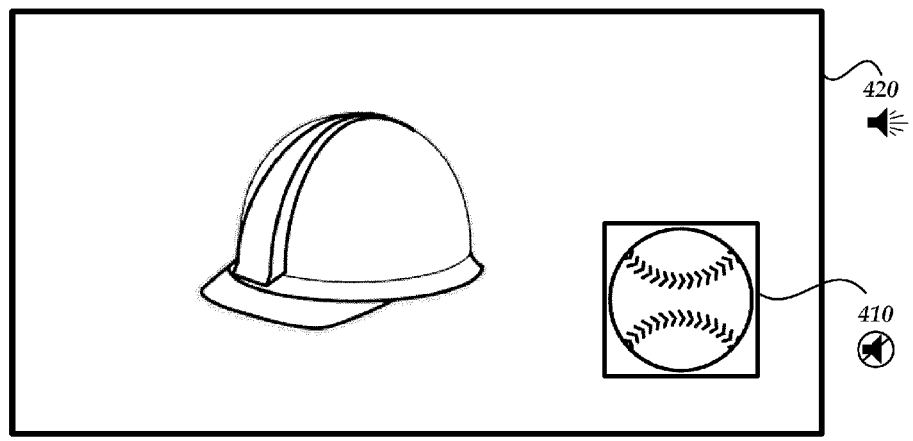
FIGS. 5A-5D are pictorial diagrams of illustrative user interfaces presenting a primary content item and several related content items, such as those on the timeline of FIGS. 4A-4B.

The related content item 420 includes a video element. In addition, the primary content item 410, while also including a video element, is in a preliminary period (e.g., pregame). In such cases, the rules applied in block 316 may specify that the video element of both items is to be presented via PIP or split-screen display. FIG. 5A illustrates such a simultaneous presentation of video content. As illustrated in FIG. 5A, related content 420 is presented in the main portion of the display area, while the primary content 410 is presented in the secondary PIP portion of the display area. In addition, the audio element of the related content 420 is presented, while the audio element of the primary content 410 is overridden or suppressed. The presentation rules may specify this approach because the primary content 410 is in a preliminary period. Other periods of the primary content 410 (e.g., post game, during commercial breaks) may also result in the primary content 410 being displayed in the secondary portion of the display area if a related content item with a video element is available or is currently being presented.

As seen in the content timeline of FIG. 4A, the documentary 420 continues after the game begins at time T2. During a subsequent iteration of the process 300 at time T2, rules may be applied which specify that the display of the primary content 410 (e.g., the broadcast of the game) is to be changed to the main display area at time T2. The documentary 420 may be changed to the secondary PIP display area, or the presentation of the documentary 420 may be stopped altogether.

Figure 5B:
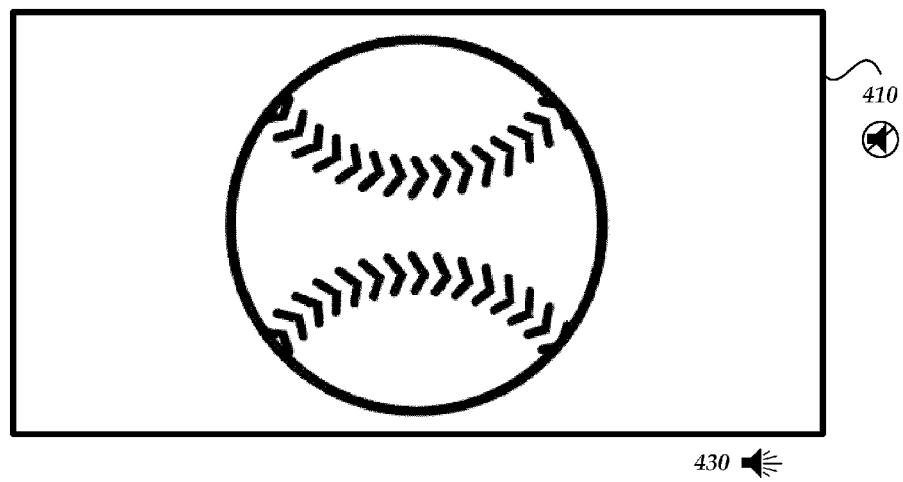

As another example, during a subsequent iteration of the process 300 at time T2 the media device 102 may determine at block 306 that a second related content item 430—the local radio broadcast of the sporting event—is available. The rules applied at block 316 may indicate that related content of this nature (e.g., an audio-only local broadcast of the sporting event) overrides the audio element of the primary content item 410. As seen in FIG. 5B, the video element of the primary content item 410—the television broadcast—may be presented while the audio element of the primary content item 410 is suppressed. In its place, the audio element of the local radio broadcast 430 may be presented.

Figure 5C:
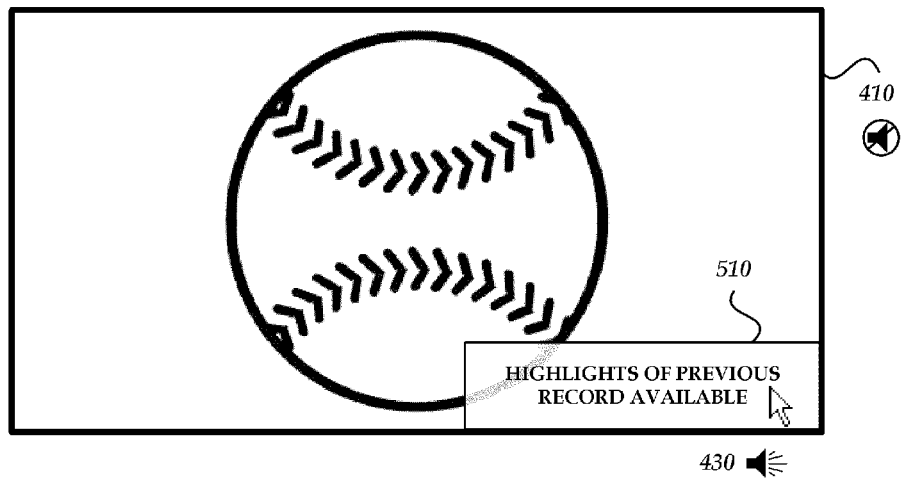

Returning to FIG. 3, during a subsequent iteration of the process 300 at time T3 the media device 102 may determine at block 306 that a third related content item 440—the highlights of the previous record—is available. At 308, preliminary rules may be applied which specify that in such cases the user is to be notified of the related content rather than automatically presented with the related content. For example, a rule may specify that when the primary content 410 is a television broadcast of a sporting event and the sporting event is in progress, related video content is not to be automatically presented. Rather, a prompt or other notification is to be presented to the user so that the user may select to display the content. As seen in FIG. 5C, an overlay notification 510 is presented so as to be conspicuous to the user but without interfering with consumption of the primary content item 410. The user may activate the notification 510, such as by using a remote control, mouse, touch screen interaction or voice command. The notification 510 of FIG. 5C is illustrative only. Other types of notifications may be presented, such as more intrusive visual prompts with interface controls that must be activated or cancelled, audible notifications such as beeps, and the like.

Figure 5D:
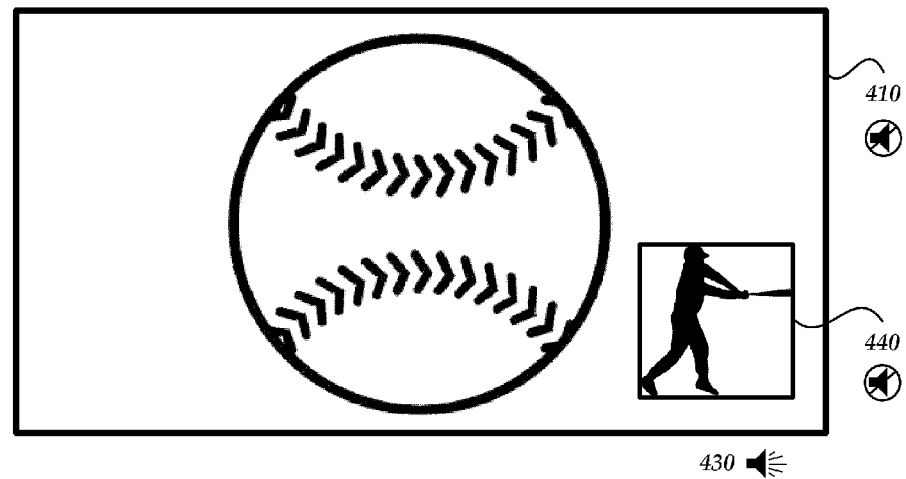

As seen in FIG. 5D, the highlights 440 may be presented to the user in a secondary PIP display area. Audio from the highlights 440 may be suppressed, in a manner similar to the suppression of the audio from the primary content 410, due to the presentation of the local radio broadcast 430. In some cases, different rules may apply, such as presentation of the highlights in the main display area while the primary content item is moved to the secondary PIP display area. The audio from the highlights 440 may also be presented while the audio from the primary content item 410 and the location radio broadcast 430 is suppressed. As yet another example, different rules may apply such that the video from the primary content item 410 and audio from the local radio broadcast 430 are both paused while the both video and audio elements of the highlights 430 are presented on the media device 102.

Figure 4B:
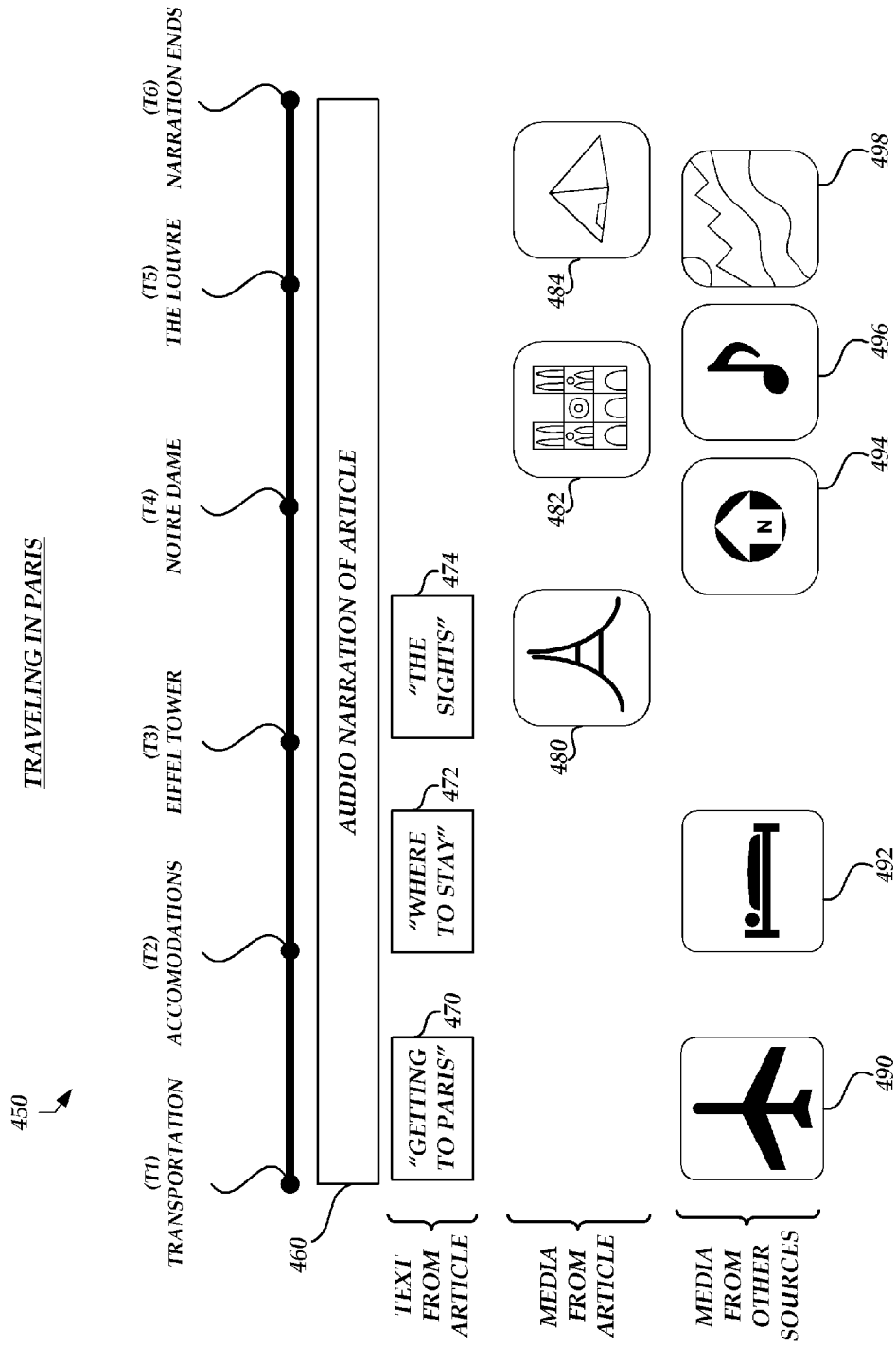
FIG. 4B is a timeline of presentation of combined content comprising portions of a primary content item and portions of related content items.

Turning now to FIG. 4B, an illustrative timeline 450 of a combined content presentation is depicted. The presentation in FIG. 4B may be produced using the same processes and systems disclosed above with respect to FIG. 4A. The primary content item of FIG. 4B is an audio narration 460 of an article from a travel magazine relating to travel in Paris, France. As explained previously, aspects of the present disclosure may be used with primary content items of many sorts, which may comprise media other than audio. When a primary content item does comprise an audio recording, the audio may or may not comprise narration of textual content. For example, the audio may correspond to an unscripted radio show, an audio element of a television show, a so-called "podcast," a live concert, or any other sort of audio content. When audio does comprise narration of textual content, the text may come from a variety of sources other than magazines, including books, newspapers, web sites, plays, etc.

With respect to timeline 450, various attributes of audio narration 460 may be identified at various points in time (T1, T2, T3, T4 and T5), and related content items associated with the identified attributes may be selected. An attribute of primary content item 460 may include a person, place, object, event, activity, time period, or any other thing that is described, portrayed, mentioned, discussed, or referenced in the primary content item. An attribute may also relate to a contextual aspect of primary content item 460, and may include, e.g., a genre, mood, location, historical setting, language or time of day. The presence or relevance of an identified attribute in the primary content item 460 may not be limited to a single point in time. Rather, an identified attribute may continue to be relevant for a period of time following the point at which it is first identified, and it may become relevant repeatedly at various points thereafter. For example, an attribute such as a historical landmark may be mentioned briefly at the beginning of a travel article, discussed in detail for an extended duration in the middle of the article, and referred back to at the end of the article. In this example, the same attribute is identified at least three times within a single primary content item, and the relevance of the attribute continues for various periods of time at each point. Thus, any related content items associated with an identified attribute may be presented substantially within the various periods of time at which the attribute is relevant to the primary content item, but the precise timing may vary according to presentation rules.

The attributes of a primary content item may be identified by analyzing the primary content item itself, e.g., the audio narration in the case of primary content item 460, or by analyzing a textual representation of the primary content item, such as the magazine article that audio narration 460 is based on. The related content items 470-498 associated with the identified attributes of primary content item 460 might come from a source that is closely related to the primary content item, or it might come from an unrelated source. For example, the related content items depicted in FIG. 4B include textual excerpts 470-474 and images 480-484, all of which may have been published in a magazine along with the text of the magazine article on which audio narration 460 is based. FIG. 4B also depicts images 490, 492, 498, along with map 494 and audio clip 496, all of which may come from sources other than the magazine in which the narrated article was published. As mentioned above with respect to FIG. 4A, related content items may be associated with primary content item 460 in real-time or substantially real-time. Furthermore, the number of attributes and related content items discussed with respect to FIG. 4B is limited for the sake of clarity, but in some embodiments many more attributes and related content items may be identified, selected, and presented. Any content item, regardless of whether it is a primary or related content item, may be part of some larger content item. For example, a content item may be part of a larger text (e.g., comprising additional words), a larger audio sequence (e.g., with a greater temporal duration), a larger video sequence (e.g., comprising additional video frames), a larger image (e.g., depicting a more expansive scene), or a larger collection of content (e.g., comprising multiple items in different mediums).

Referring now to timeline 450, at time T1 the audio narration 460 begins with a discussion of transportation options that a traveler might use to reach Paris. Based on this discussion, attributes such as transportation generally or a specific airline that flies to Paris may be identified. Related content associated with these attributes may then be selected. Related content items may include the text excerpt "Getting to Paris," from the magazine article on which audio narration 460 is based, or image 490, showing an airplane belonging to the specific airline that was identified from the narration. At time T2, audio narration 460 may turn to a discussion of recommended accommodations in the Paris area. Based on this discussion, attributes such as accommodations generally or a specific recommended hotel may be identified, and related content such as the text "Where to Stay" or an image of a room from the recommended hotel may be selected. At time T3, discussion may turn to notable tourist sights in Paris, beginning with the Eiffel Tower. This discussion may continue through times T4 and T5 with discussion of Notre Dame and the Louvre, respectively. The discussion of sightseeing may include details about the sights themselves, as well as topics like navigating Paris by walking or public transportation. Accordingly, attributes such as Paris streets and Paris landscapes may be identified, along with the Eiffel Tower, Notre Dame and the Louvre. Related content items selected from these attributes may include text 474 and images 480-484, all from the magazine article on which audio narration 460 is based, along with map 494, audio clip 496, and image 498, all from other sources. Image 480 depicts the Eiffel Tower, image 482 depicts Notre Dame, and image 484 depicts the Louvre. Map 494 may depict the streets of Paris, including a highlighted route between each of the sights that correspond to identified attributes, obtained from a publicly accessible mapping service. Audio clip 496 may comprise a recording of the cathedral bells at Notre Dame, obtained from a library of stock recordings. Image 498 may comprise a photograph of a Parisian park, tagged with GPS location information indicating that it is in the vicinity of the Louvre, and obtained from a social media web site.

As described previously with respect to FIG. 3 and FIG. 4A, presentation rules may be applied to determine how related content items should be presented. In some embodiments, presentation rules may define which portions of which content items are presented at various times. In addition, presentation rules may define a size (e.g., one or more spatial dimensions such as height, width, length or depth) or position of presentation for a visual element of a content item, or a volume level for an audio element of a content item. Presentation rules may also specify that multiple content items are presented simultaneously, such as by mixing of audio content, split screen presentation of visual content, or combining visual elements from a first set of content items with audio elements from a second set of content items. In some embodiments, presentation rules may be used to determine transitions or animations, comprising specified changes in size, position, volume level, or other presentation aspects over a specified period of time.

The presentation rules that are applied to a primary content item and related content items may be configured by a user, as described below with respect to FIGS. 6A and 6B. In addition, some presentation rules may be defined by default, while other presentation rules may be tailored to specific content items or groups of content items. Tailored presentation rules may be delivered with the corresponding content items, such as by embedding the rules in the content items, or by including references to the rules in the same data package as the content items.

Figure 6A:
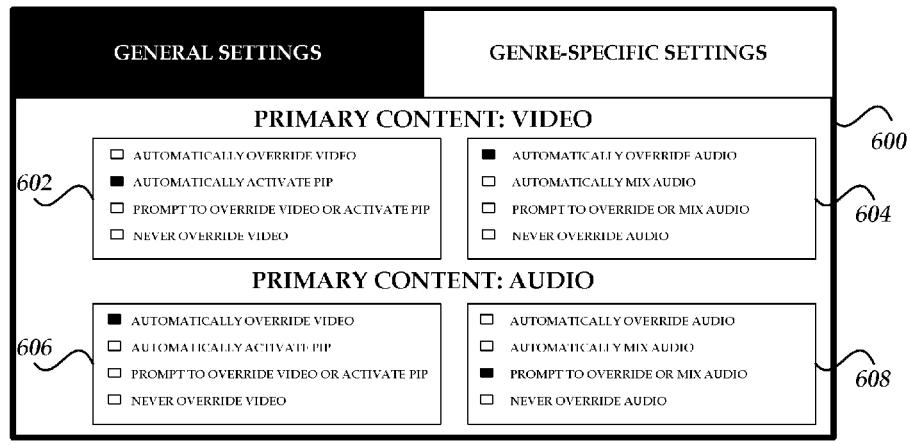
FIGS. 6A-6B are pictorial diagrams of illustrative user interfaces for configuring rules regarding the presentation of related content during presentation of a primary content item.
Figure 6B:
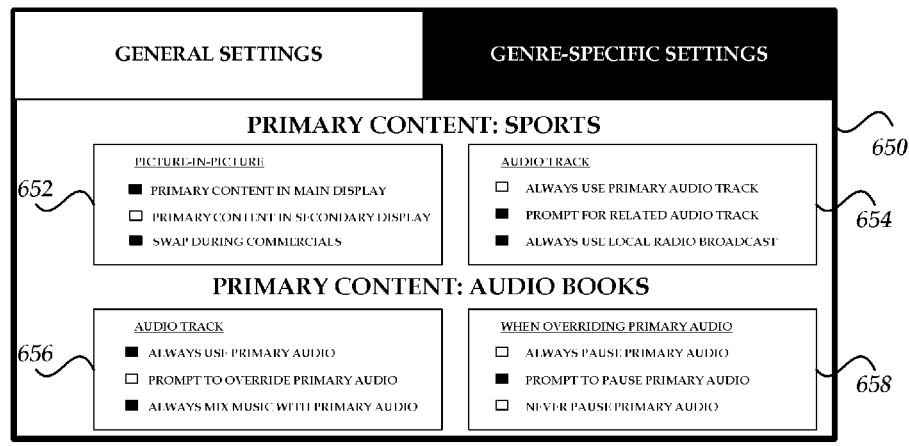

FIGS. 6A and 6B show illustrative user interfaces 600a and 600b, respectively, that may be used to configure rules for presentation of primary and related content items. As seen in FIG. 6A, a user may specify general settings that apply to all video and audio content by default. For example, if a multimedia content item is primarily video-based (e.g., sports), settings 602, 604 may be configured regarding when to override the audio and/or video elements of the device. If a multimedia content item is primarily audio-based (e.g., some news casts), or if the content is only audio (e.g., audio books), then different settings 606, 608 may be configured by the user.

FIG. 6B illustrates an example interface 600b to configure genre-specific settings. For example, the settings 652, 654 for sporting events may be configured independently of the default settings 602, 604 for video-based content, as set in the interface 600a of FIG. 6A. As another example, audio books may provide an opportunity to utilize settings 656, 658 that do not apply to general audio-based content. For example, music may be mixed with the audio element of an audio book, while other primary content items that are primarily audio-based may not experience the same effectiveness from mixing or otherwise combining related content audio elements with the primary content audio element.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for combining related content, the system comprising:
    a data store configured to store computer-executable instructions and presentation rules;
    a computing device having at least one processor and in communication with the data store, the computing device, when executing the computer-executable instructions, configured to:
        receive a first request for presentation of combined content, wherein the first request identifies an audio content item to include in the combined content as a primary content item;
        obtain a complete textual version of the audio content item;
        determine, from the complete textual version of the audio content item, an attribute of the audio content item;
        determine, based at least in part on a first presentation rule, that a visual content item is associated with the attribute of the audio content item;
        determine a first presentation configuration for the audio content item and the visual content item, the first presentation configuration specifying a presentation for the visual content item relative to the audio content item in accordance with a second presentation rule that changes a presentation aspect of the visual content item;
        cause presentation of the audio content item and the visual content item as the combined content according to the first presentation configuration;
        receive a second request to designate the visual content item as the primary content item;

determine a second presentation configuration for the visual content item and at least one secondary content item, wherein the at least one secondary content item relates to the visual content item, and wherein the second presentation configuration differs from the first presentation configuration; and update the presentation of the combined content according to the second presentation configuration.

2. The system of claim 1, wherein the audio content item comprises audio narration of text from at least one of a book, a newspaper, a magazine, and a web page.

3. The system of claim 2, wherein the visual content item comprises an image from at least one of the book, the newspaper, the magazine, and the web page.

4. The system of claim 2, wherein the complete textual version of the audio content item comprises the text from at least one of the book, the newspaper, the magazine, and the web page.

5. The system of claim 1, wherein the visual content item comprises a video from a publicly accessible repository of videos.

6. The system of claim 1, wherein the audio content item comprises an unscripted audio recording, and the complete textual version of the audio content item comprises a transcript of the recording generated by at least one of manual transcription and automated voice recognition.

7. The system of claim 1, wherein to determine the attribute of the audio content item from the complete textual version of the audio content item, the computing device, when executing the computer-executable instructions, is configured to:

identify a word in the complete textual version of the audio content item;

determine that the word corresponds to a person, place, thing, event, genre, mood, location, historical setting, language, or period of time; and identify the person, place, thing, event, genre, mood, location, historical setting, language, or period of time as the attribute of the audio content item.

8. The system of claim 1, wherein the primary content item comprises a content item that is presented in a default presentation configuration, and wherein the second presentation configuration overrides presentation of at least a portion of the primary content item.

9. A computer-implemented method for combining related content, the computer-implemented method comprising:

under control of one or more computing devices configured with specific computer-executable instructions, receiving a first request for presentation of combined content, wherein the first request identifies a first content item to include in the combined content as a primary content item;

obtaining a complete textual version of the first content item;

determining, from the complete textual version of the first content item, an attribute of the first content item;

determining, based at least in part on a first presentation rule, that a related content item is associated with the attribute of the first content item;

determining a first presentation configuration for a portion of the first content item and a portion of the related content item according to a second presentation rule that changes a presentation aspect of at least one of the portion of the first content item and the portion of the related content item;

causing presentation of the portion of the first content item and the portion of the related content item as the combined content according to the first presentation configuration;

receiving a second request to designate the related content item as the primary content item;

determining a second presentation configuration for the related content item and at least one additional content item, wherein the at least one additional content item relates to the related content item, and wherein the second presentation configuration differs from the first presentation configuration; and updating the presentation of the combined content according to the second presentation configuration.

10. The computer-implemented method of claim 9, wherein at least one of the first content item and the related content item are part of a larger content item.

11. The computer-implemented method of claim 9, wherein the attribute comprises at least one of a genre of the first content item, a mood of the primary first content item, a location of the first content item, a historical setting of the first content item, a time of day of the first content item, a language of the first content item, a person associated with the first content item, a place associated with the first content item, an object associated with the first content item, an event associated with the first content item, and a time associated with the first content item.

12. The computer-implemented method of claim 9, wherein at least one of the first presentation rule and the second presentation rule is user-definable.

13. The computer-implemented method of claim 9, wherein at least one of the first presentation rule and the second presentation rule is received from a network-accessible server.

14. The computer-implemented method of claim 9, wherein the first presentation configuration specifies a presentation for at least one of the portion of the first content item and the portion of the related content item.

15. The computer-implemented method of claim 9, wherein the first presentation configuration specifies at least one of:

one or more spatial dimensions for a visual element of at least one of the portion of the first content item and the portion of the related content item;

a position for a visual element of at least one of the portion of the first content item and the portion of the related content item; and a volume level for an audio element of at least one of the portion of the first content item and the portion of the related content item.

16. The computer-implemented method of claim 9, wherein the first presentation configuration specifies at least one of:

a change in volume level over time for an audio element of at least one of the portion of the first content item and the portion of the related content item;

a change in one or more spatial dimensions over time for a visual element of at least one of the portion of the first content item and the portion of the related content item; and a change in position over time for a visual element of at least one of the portion of the first content item and the portion of the related content item.

17. The computer-implemented method of claim 9, wherein causing presentation according to the first presentation configuration requires combining at least one of an audio element and a visual element of the portion of the first content item with at least one of an audio element and a visual element of the portion of the related content item.

18. The computer-implemented method of claim 9, wherein the primary content item comprises a content item that is presented in a default presentation configuration, and wherein the first presentation configuration overrides presentation of at least a portion of the primary content item.

19. A non-transitory computer readable medium comprising executable code that, when executed by a processor, causes a computing device to perform a process comprising:
receiving a request for presentation of combined content, the request identifying a first content item as a primary content item;
obtaining a complete textual version of the first content item;
determining, from the complete textual version of the first content item, an attribute from the first content item;
determining, based at least in part on a first presentation rule, that a related content item is associated with the attribute from the first content item;
determining a first presentation configuration for a portion of the first content item and a portion of the related content item according to a second presentation rule that changes a presentation aspect of at least one of the portion of the first content item and the portion of the related content item;
causing presentation of the portion of the first content item and the portion of the related content item as combined content according to the first presentation configuration;
receiving a request to designate the related content item as the primary content item;
determining a second presentation configuration for at least a portion of the related content item and at least a portion of an additional content item, wherein the additional content item relates to the related content item, and wherein the second presentation configuration differs from the first presentation configuration; and
updating the presentation of the combined content according to the second presentation configuration.

20. The non-transitory computer readable medium of claim 19, wherein at least one of the first content item and the related content item are part of a larger content item.

21. The non-transitory computer readable medium of claim 19, wherein the attribute comprises at least one of a genre of the first content item, a mood of the first content item, a location of the first content item, a historical setting of the first content item, a time of day of the first content item, a language of the first content item, a person associated with the first content item, a place associated with the first content item, an object associated with the first content item, an event associated with the first content item, and a time associated with the first content item.

22. The non-transitory computer readable medium of claim 19, wherein at least one of the first presentation rule and the second presentation rule is user-definable.

23. The non-transitory computer readable medium of claim 19, wherein at least one of the first presentation rule and the second presentation rule is received from a network-accessible server.

24. The non-transitory computer readable medium of claim 19, wherein the first presentation configuration specifies a presentation for at least one of the portion of the first content item and the portion of the related content item.

25. The non-transitory computer readable medium of claim 19, wherein the first presentation configuration specifies at least one of:
one or more spatial dimensions for a visual element of at least one of the portion of the first content item and the portion of the related content item; and
a position for a visual element of at least one of the portion of the first content item and the portion of the related content item; and
a volume level for an audio element of at least one of the portion of the first content item and the portion of the related content item.

26. The non-transitory computer readable medium of claim 19, wherein the first presentation configuration specifies at least one of:
a change in volume level over time for an audio element of at least one of the portion of the first content item and the portion of the related content item;
a change in size over time for a visual element of at least one of the portion of the first content item and the portion of the related content item; and
a change in position over time for a visual element of at least one of the portion of the first content item and the portion of the related content item.

27. The non-transitory computer readable medium of claim 19, wherein causing presentation according to the first presentation configuration requires combining at least one of an audio element and a visual element of the portion of the first content item with at least one of an audio element and a visual element of the portion of the related content item.

28. The non-transitory computer readable medium of claim 19, wherein the primary content item comprises a content item that is presented in a default presentation configuration, and wherein at least one of the first and second presentation configurations overrides presentation of at least a portion of the primary content item.

* * * * *